United States Patent
Becker et al.

(10) Patent No.: US 11,248,803 B2
(45) Date of Patent: Feb. 15, 2022

(54) GAS APPLIANCE IGNITION MODULE

(71) Applicant: Channel Products, Inc., Solon, OH (US)

(72) Inventors: James S. Becker, Chardon, OH (US); Christopher Korman, Akron, OH (US)

(73) Assignee: Channel Products, Inc., Solon, OH (US)

( * ) Notice: Subject to any disclaimer, the term of this patent is extended or adjusted under 35 U.S.C. 154(b) by 251 days.

(21) Appl. No.: 16/656,958

(22) Filed: Oct. 18, 2019

(65) Prior Publication Data

US 2020/0124290 A1    Apr. 23, 2020

Related U.S. Application Data

(60) Provisional application No. 62/747,365, filed on Oct. 18, 2018.

(51) Int. Cl.
| | |
|---|---|
| *F23N 5/02* | (2006.01) |
| *F24C 3/10* | (2006.01) |
| *F23Q 3/00* | (2006.01) |

(52) U.S. Cl.
CPC ............. *F24C 3/103* (2013.01); *F23N 5/022* (2013.01); *F23Q 3/006* (2013.01)

(58) Field of Classification Search
CPC .......... F24C 3/103; F23N 5/022; F23Q 3/006
USPC ........................... 431/66; 126/152 R; 99/330
See application file for complete search history.

(56) References Cited

U.S. PATENT DOCUMENTS

| | | |
|---|---|---|
| 3,676,630 A | 7/1972 | Dennison |
| D258,358 S | 2/1981 | Iyoda et al. |
| D266,084 S | 9/1982 | Colavecchio |
| 4,419,555 A | 12/1983 | Kim |
| 4,480,163 A | 10/1984 | Morris et al. |
| 5,170,768 A | 12/1992 | Eileraas |

(Continued)

FOREIGN PATENT DOCUMENTS

| | | |
|---|---|---|
| DE | 10 2009 044315 A1 | 4/2011 |
| EP | 0 219 205 A1 | 4/1987 |
| JP | S53-24774 U | 3/1978 |

OTHER PUBLICATIONS

PCT Invitation to Pay Additional Fees and, Where Applicable Protest Fee from International Application No. PCT/US2019/056911, dated Jan. 23, 2020, 18 pages.

(Continued)

*Primary Examiner* — Avinash A Savani

(74) *Attorney, Agent, or Firm* — Tucker Ellis LLP; Heather M. Barnes; Michael G. Craig

(57) ABSTRACT

One or more techniques and/or systems are disclosed for an ignition control module for a gas appliance. The housing of the ignition control module, and/or the mounting points for mounting the module to a gas appliance, can be configured to dispose the battery in a manner that provides for potential battery leakage to flow away from most operable components of the module. Further, the ignitor connection terminals can be configured to provide for ease of connection, by providing a connector guide disposed in a cylindrically-shaped terminal housing. Additionally, an ignitor actuator terminal can be configured to selectably engage with an ignitor actuator connector, where the ignitor actuator terminal comprises at least two connector points that engage with a single ignitor actuator connector.

20 Claims, 14 Drawing Sheets

(56) References Cited

U.S. PATENT DOCUMENTS

| | | | |
|---|---|---|---|
| 5,384,442 A | 1/1995 | Danner | |
| D392,621 S | 3/1998 | Lorenzo Regidor | |
| 6,124,556 A | 9/2000 | Thalhammer | |
| D469,411 S | 1/2003 | Decosse | |
| 6,965,085 B1 | 11/2005 | Orrico et al. | |
| 7,884,299 B2 | 2/2011 | Glew | |
| D633,444 S | 3/2011 | Chau et al. | |
| D645,005 S | 9/2011 | Menheere | |
| D654,880 S | 2/2012 | Lam | |
| D692,841 S | 11/2013 | Li et al. | |
| D725,612 S | 3/2015 | Schlegel et al. | |
| 9,412,530 B2 | 8/2016 | Kirita | |
| 9,543,089 B2 | 1/2017 | Kirita | |
| D791,701 S | 7/2017 | Becker et al. | |
| 10,096,438 B2 | 10/2018 | Yamamoto | |
| D852,149 S | 6/2019 | Wasmeier et al. | |
| D880,433 S | 4/2020 | Woo | |
| D882,533 S | 4/2020 | Fujino | |
| D883,239 S | 5/2020 | Fujino | |
| D885,356 S | 5/2020 | Rogge et al. | |
| 2002/0148460 A1* | 10/2002 | Hsu | F24C 3/103 126/39 E |
| 2003/0148655 A1* | 8/2003 | Bluhm | H01M 50/209 439/500 |
| 2006/0209484 A1 | 9/2006 | Roell et al. | |
| 2007/0102275 A1 | 5/2007 | Genz et al. | |
| 2007/0193867 A1 | 8/2007 | Lorenzo Riera et al. | |
| 2008/0229864 A1 | 9/2008 | Isono et al. | |
| 2009/0116239 A1 | 5/2009 | Wu et al. | |
| 2010/0206705 A1 | 8/2010 | Yamamoto | |
| 2010/0220495 A1 | 9/2010 | Truesdale et al. | |
| 2012/0075063 A1 | 3/2012 | Sakamoto et al. | |
| 2012/0192852 A1* | 8/2012 | Whitmire | F24B 15/005 126/25 B |
| 2012/0199461 A1 | 8/2012 | Shim et al. | |
| 2013/0037392 A1 | 2/2013 | Nakajima et al. | |
| 2014/0042002 A1 | 2/2014 | Chu | |
| 2016/0178213 A1* | 6/2016 | Petersen | F24C 3/126 126/39 E |
| 2017/0138607 A1 | 5/2017 | Becker et al. | |
| 2018/0038478 A1 | 2/2018 | Arakawa et al. | |
| 2018/0047528 A1 | 2/2018 | Yamamoto | |
| 2018/0056177 A1 | 3/2018 | Sakamoto et al. | |
| 2018/0210486 A1 | 7/2018 | Choi et al. | |
| 2018/0330902 A1 | 11/2018 | Takada et al. | |
| 2019/0088422 A1 | 3/2019 | Thizon et al. | |
| 2019/0108953 A1 | 4/2019 | Dooley | |
| 2020/0110492 A1 | 4/2020 | Sun | |
| 2020/0124290 A1 | 4/2020 | Becker et al. | |
| 2020/0174512 A1 | 6/2020 | Battlogg | |
| 2020/0241586 A1 | 7/2020 | Dil et al. | |
| 2020/0253073 A1 | 8/2020 | Cui et al. | |

OTHER PUBLICATIONS

International Search Report and Written Opinion from corresponding International Application No. PCT/US2019/056911, dated Mar. 20, 2020, 22 pages.

\* cited by examiner

GAS APPLIANCE IGNITION MODULE

CROSS-REFERENCE TO RELATED APPLICATIONS

This application claims priority to U.S. Provisional Patent Application Ser. No. 62/747,365, entitled MODULAR ELECTRICAL CONNECTOR, filed Oct. 18, 2018, which are incorporated herein by reference.

BACKGROUND

Gas appliances, such as gas grills and other cooking devices, often utilize ignitors mounted onto the appliance. Some are powered by a power source, such one or more batteries, and such devices typically comprise a control module to control the ignition source. An ignition module can comprise or be coupled with an actuator switch, used by a user, and one or more ignitors, for igniting the fuel. The module itself is often mounted on the appliance, and it can be mounted in a variety ways. For example, some modules have the actuator switch engaged with the module, while others have a connector, such as a wire, leading from the switch to a remotely mounted module. Modules with the actuator switch, such as a button, directly engaged with the module typically utilize a battery compartment that protrudes through the panel of the appliance to which the module is mounted. In any event the battery within the module can provide electrical power to an electronic circuit therein in order to generate a voltage potential. If the voltage is applied to an electrode (e.g., in the ignitor), and the voltage is sufficiently large enough, the air across a gap on the electrode will be ionized and a spark will be generated, thereby enabling an air/gas mixture surrounding the gap to be ignited.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, an ignition control module for a gas appliance can be devised that provide for controlling an ignition source for the gas appliance, such as when an ignition actuator switch is activated by a user of the appliance. The ignition control module can be configured to provide for ease of installation and use by providing improved connection points for respective ignitor connectors and/or actuator switch connection. Further, the ignition control module can be configured to provide for mitigating exposure to potential contaminants, such as introduced by accident, environmental condition, during use, and/or battery material leakage. For example, the battery can be disposed in a position that reduces potential damage from leaks; and the connection points can be protect from exposure.

In one implementation, an exemplary ignition module for use on a gas appliance can comprise a base housing. The base housing can be configured to be fixedly mounted on the gas appliance. Further, the exemplary ignition module can comprise a battery compartment that is engaged with the base housing. The battery compartment can be configured to hold a battery in its operable position when the base housing is mounted for operation on the gas appliance. Additionally, when the module is mounted for operation, the battery compartment can be configured to dispose the battery's negative terminal at a lower elevation than the battery's positive terminal. The battery compartment can comprise a battery access portion that operates to selectably access the battery compartment, such as to install or remove a battery.

In another implementation, an exemplary device for controlling an ignition source in a gas appliance can comprise a housing. The housing can be configured to enclose, at least partially, one or more control components disposed therein. Further, the exemplary device for controlling an ignition source in a gas appliance can comprise one or more ignitor terminals that are engaged with the housing. The one or more ignitor terminals can respectively comprise an ignitor terminal connector that is configured to selectably, operably couple with a corresponding ignitor connector.

In another implementation, an exemplary device for controlling an ignition source in a gas appliance can comprise an activation module. The activation module can comprise a low profile that is also weather resistant. The activation module can selectably engage with a target grill and with the ignition module. Activating the activation module can close a circuit that results in electrical power from a battery in the ignition module being provided to one or more ignitors coupled with the ignition module.

In another implementation, a gas appliance ignition apparatus can comprise a housing. The housing can be configured to enclose, at least partially, one or more control components disposed therein. Further, the exemplary device for controlling an ignition source in a gas appliance can comprise one or more ignitor terminals that are engaged with the housing. Additionally, the exemplary device for controlling an ignition source in a gas appliance can comprise an ignitor actuator terminal that is engaged with the apparatus housing. The ignitor actuator terminal can be configured to selectably engage with an ignitor actuator connector. The ignitor actuator terminal can comprise an ignitor actuator terminal connector that comprises at least two terminal electrical connection points. The ignitor actuator terminal can also comprise an ignitor actuator terminal housing that is configured to selectably receive the ignitor actuator connector. The ignitor actuator terminal housing receiving the ignitor actuator connector can result in an electrical connection between the ignition apparatus and an ignitor actuator.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1A:
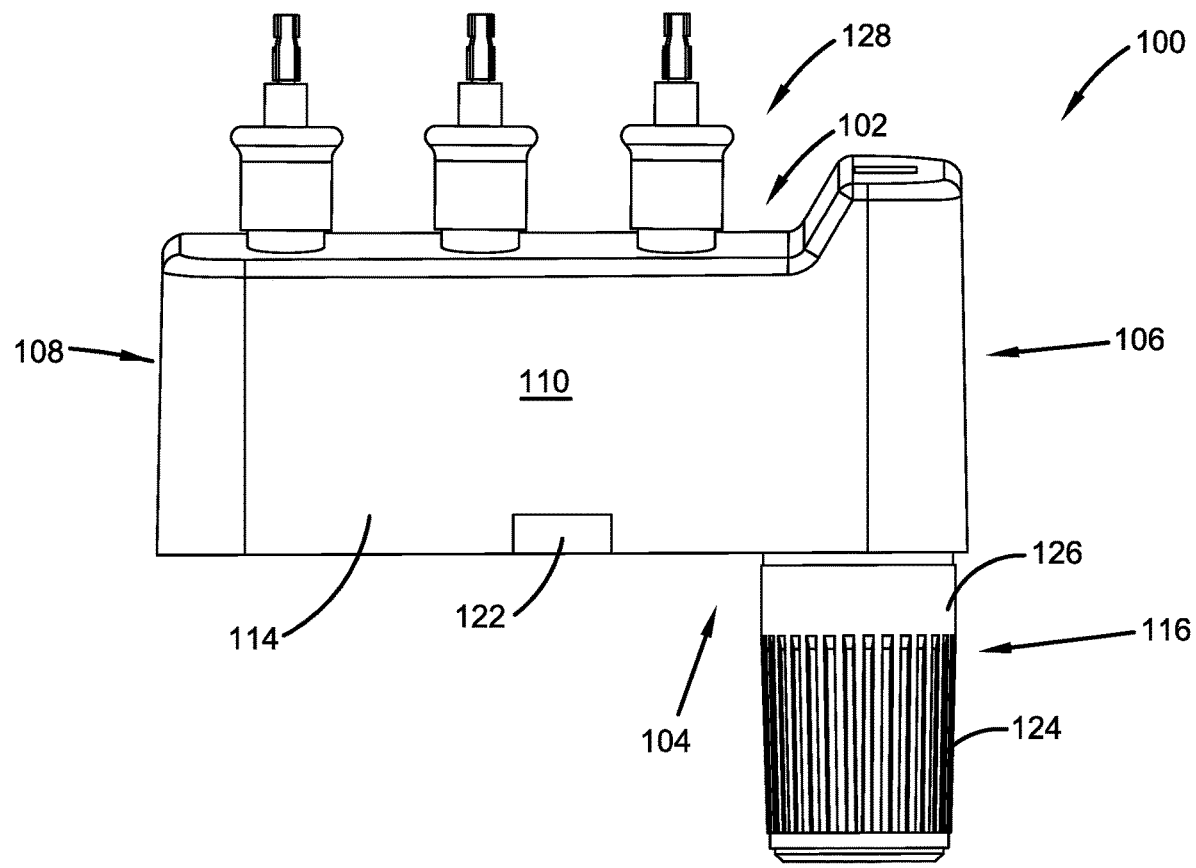
FIGS. 1A, 1B, 1C, 1D, and 1E are components diagram illustrating various views of an exemplary ignition control module in accordance with one or more devices described herein.
Figure 1B:
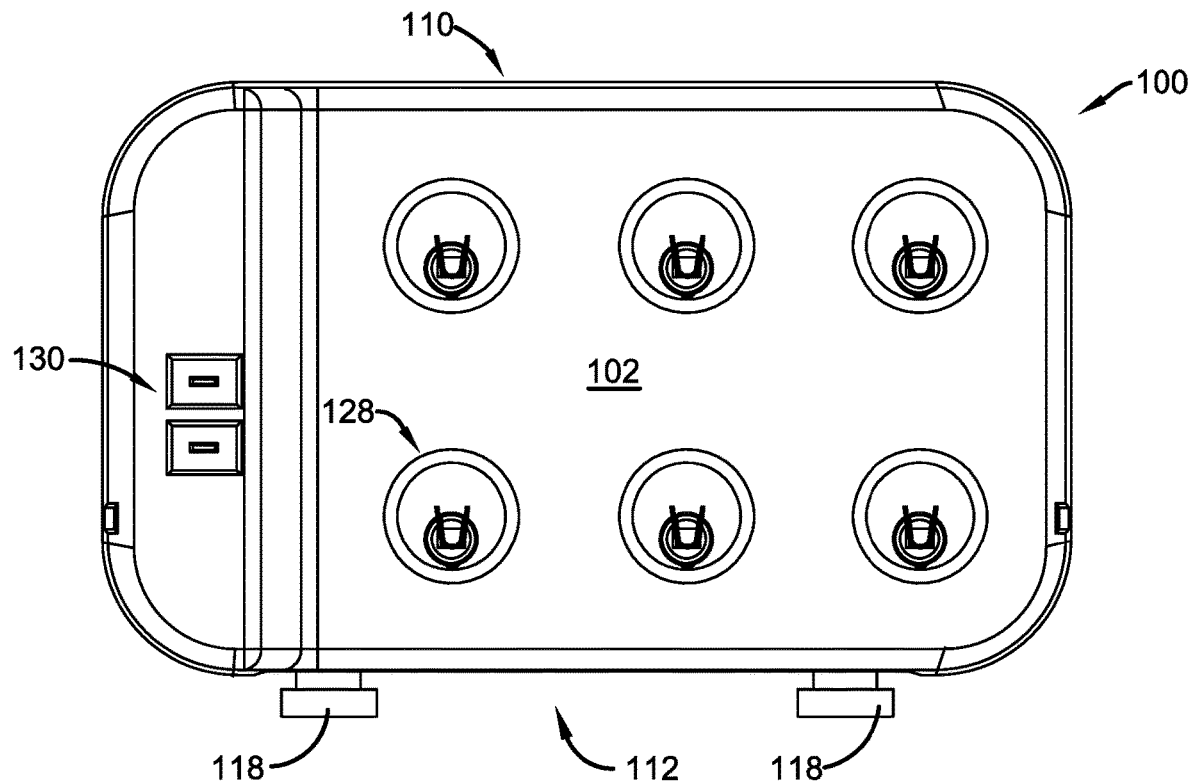
Figure 1C:
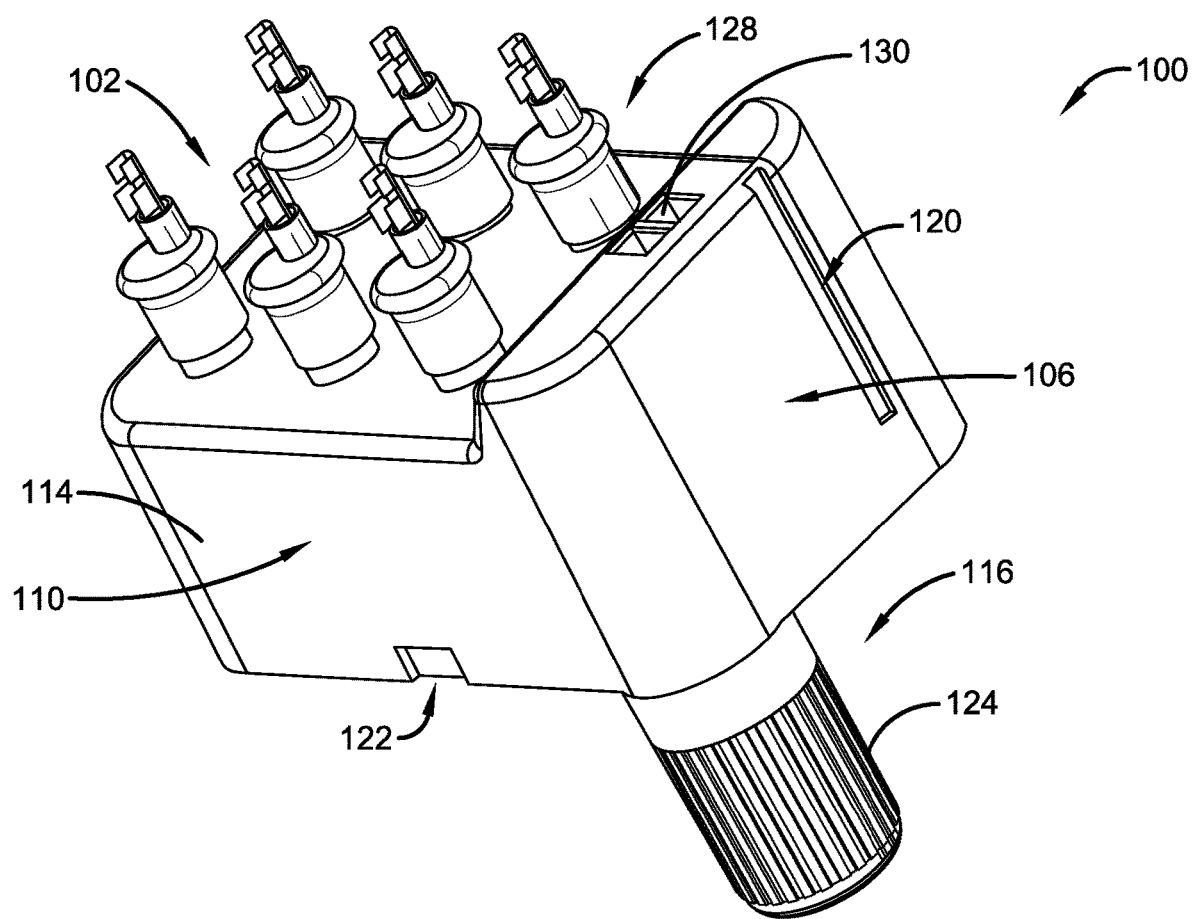
Figure 1D:
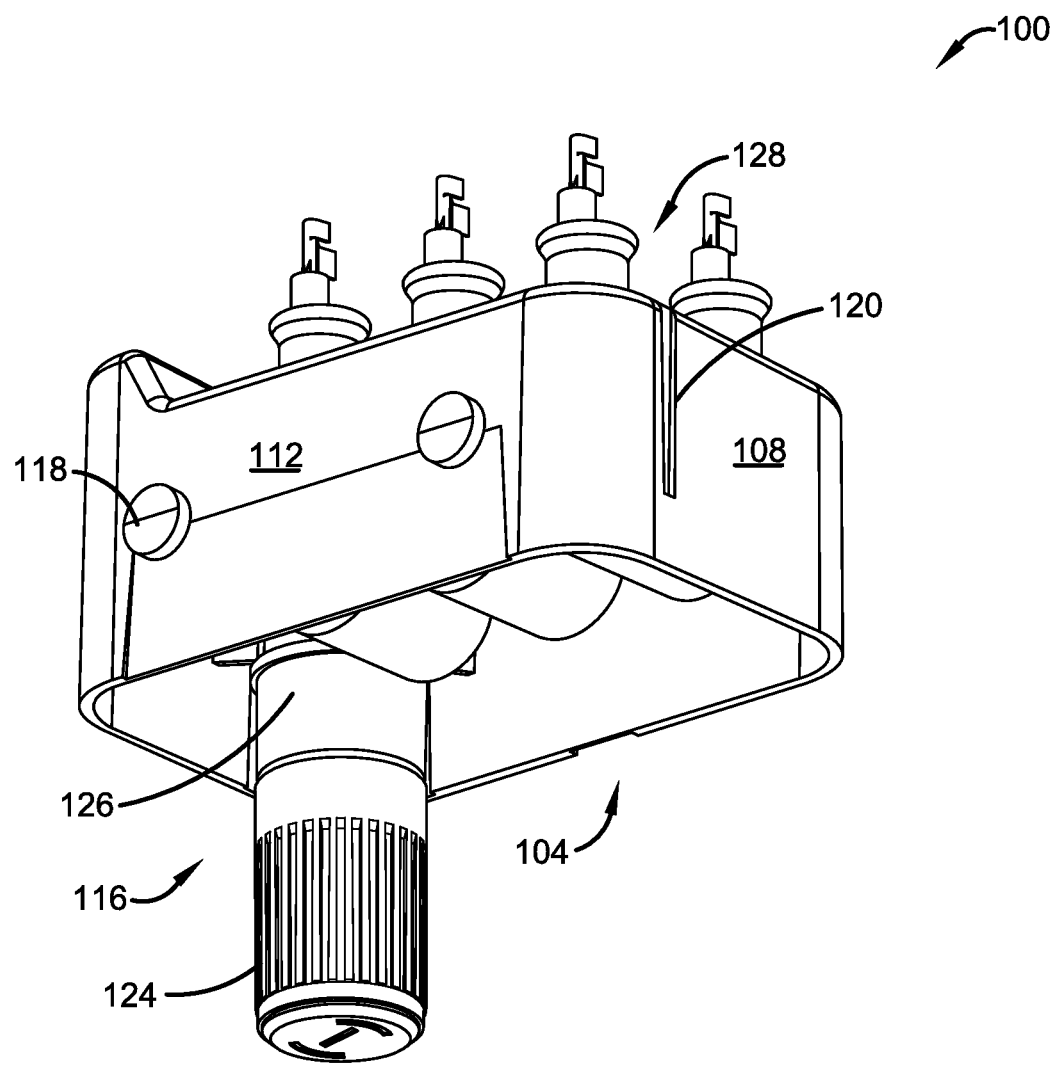
Figure 1E:
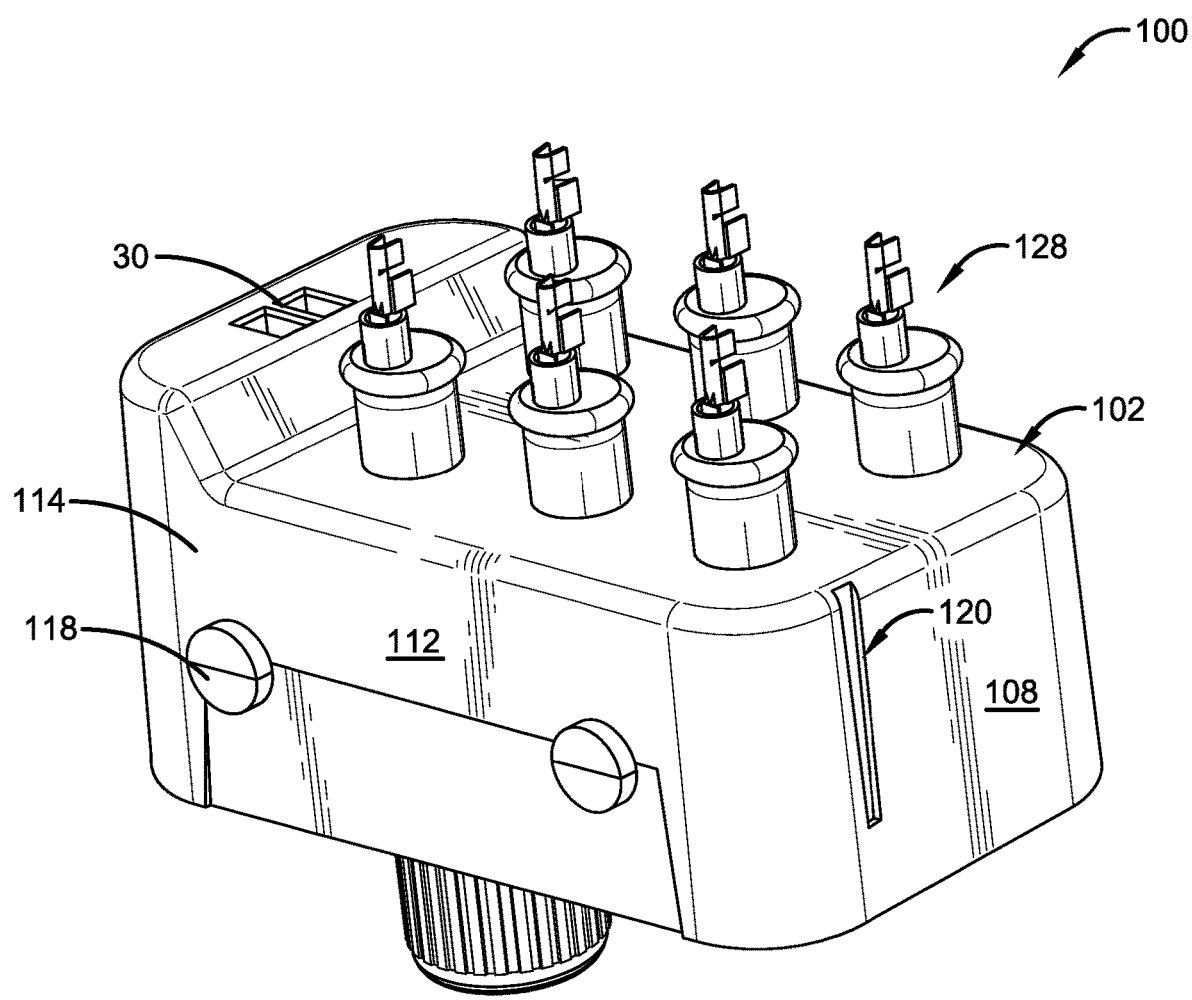

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

The term "gas," as in gas appliance or gas grill, or a gas fuel used in said systems, may be used in furtherance of disclosure of the details of the claimed ignition module device or apparatus. It should be noted that the term "gas" may refer to a flammable gas, such as propane, natural gas, or the like; and/or a flammable mixture of air and vapors or air entrained droplets of a flammable liquid, such as kerosene, lighter fluid, or the like; or any such combination. In general, the term "gas" can refer to a fuel used in a gas appliance of any kind.

As described herein, an ignition module device or apparatus may be devised for installation on a gas appliance, such as a gas grill or the like, for example. In one implementation, such an ignition module can be configured to use a battery as a power source to provide an ignition source, such as a spark, upon actuation, such as by a user of the gas appliance. For example, a gas appliance (e.g., gas grill) may comprise an actuator switch (e.g., button) coupled with the ignition module. Activating the switch (e.g., pressed) can result in the ignition module sending an electrical charge to a coupled ignitor, disposed proximate a gas burner. In this example, the electrical charge sent to the ignitor can result in a spark, which acts as the ignition source to ignite gas released from the burner. In one implementation, such a device can be installed on a gas appliance that is subjected to environmental conditions which can result in a shortened life for the module. In this implementation, an example ignition module may comprise a configuration that mitigates exposure to deleterious environmental conditions, and/or is configured to provide for extended life when exposed to such conditions.

In one implementation, an exemplary ignition module can comprise a base housing that is configured to be fixedly mounted on a gas appliance surface. As an example, an ignition module may be mounted on an under surface of a gas grill, such as proximate the burner controls, ignition switch, and/or under the grill cooking area itself; usually, at least partially covered by a portion of the grill (e.g., shelf, cover, control mounting surface, etc.). In one implementation, as illustrated in the base housing can be mounted on a gas appliance vertical surface.

The exemplary ignition module can comprise a battery compartment that is engaged with the base housing. The battery compartment can be configured to hold a battery in its operable position, such as during use, when mounted on the gas appliance, for example. Further, the battery compartment can be configured to dispose the battery's negative terminal at a lower elevation than the battery's positive terminal, when the base housing is mounted for operation on the gas appliance surface.

As one example, the battery compartment can hold a battery comprising a negative terminal and a positive terminal. In one or more implementations, as illustrated in when the example ignition module is mounted in an operable position, the central axis of the battery compartment can be disposed at angle from a vertex point at the mounting surface that provides a downward slope from horizontal. That is, for example, the battery compartment slopes downward toward the distal end. In this way, in this implementation, the negative terminal of the battery can be disposed at a lower elevation than the positive terminal.

Commonly, batteries comprise a design that disposes the negative terminal at a first end/side of the battery, and the positive terminal at a second, opposing end/side of the battery. Further, some batteries (e.g., cylindrical style) are formed with a tube portion and a cap, where the tube portion contains a substantive portion of the electro-chemical materials, and the cap seals the end of the tube to mitigate leakage of chemicals. Typically, the closed end of the tube portion comprises the positive terminal, and the cap comprises the negative terminal of the battery. For this reason, for example, when leakage occurs from a battery, it typically occurs proximate the negative terminal, as the cap is a potential weak point in the battery's seal. Materials leaked from a battery can comprise corrosive chemicals that often result in damage to the equipment utilizing the battery. Therefore, disposing the negative terminal of the battery at a lower elevation than the positive terminal may limit exposure to potentially leaked materials to merely the negative terminal end of the battery.

In one implementation, the battery compartment can comprise a battery access portion, disposed at a first end of the battery compartment. The battery access portion can be operable to selectably access the battery compartment. For example, devices that utilize batteries typically comprise an access point for installing and/or replacing batteries, particularly if there is no means for recharging a battery in place, in the device. A battery compartment access can comprise a variety of designs that are selected, based on suitability for the intended purpose of the host device. For example, for an ignition control module, the battery access portion may be readily accessible, and provide for ease of use, as the module may be mounted in a location that is not easily accessed (e.g., hidden behind an appliance partition or component).

In this implementation, the battery access portion may comprise a graspable surface; and, in conjunction with a body portion 134 disposed at a second end of the battery compartment, can comprise an engagement component that allows the battery access portion to be selectably opened and closed. As an example, the battery access portion may be selectably engaged with the body portion of the battery compartment using a threaded fitting, clasp(s), fastener(s), clip, or other similar means, with or without a hinge apparatus. The body portion of the battery compartment may be removed from the body portion of the battery compartment, or the battery compartment may remain, at least partially, engaged with the body portion of the battery compartment, such as by use of a hinge-like mechanism.

In one implementation, the battery access portion may comprise a cap that can be engaged with the body portion of the battery compartment, where the battery compartment projects from the housing of an example module. It should be noted that, although the example implementations illustrated disclose the battery compartment projecting from the base housing orthogonally from a longitudinal axis of the base housing, it is anticipated that alternate implementations may be devised by those skilled in the art. For example, the central axis of the battery compartment may be disposed in parallel with the central or longitudinal axis of the base housing; or the central axis of the battery compartment may be disposed in parallel with the lateral axis of the base housing. In these examples, the module can be mounted on the appliance surface in such a manner that provide for the negative terminal of the battery being disposed at a lower elevation than the positive terminal.

In one implementation, the battery access portion of the battery compartment can comprise a negative electrical contact terminal for the ignition module. In this implementation, a positive electrical contact terminal for the ignition module can be fixedly disposed at an opposing end of the battery compartment, such as in the battery compartment body portion. That is, for example, the battery compartment can comprise a cylindrically shaped tube for holding a cylindrically shaped battery (e.g., AA, AAA, C, D sized), with its terminals disposed at opposite ends. In this example, the negative electrical contact terminal, for contacting the battery's negative terminal, can be in the access end of the battery compartment, such as in a cap-shaped battery access portion. Additionally, the positive electrical contact terminal can be disposed at the other end of the battery compartment, such as in the body portion.

In one implementation, the body portion, comprising the positive electrical contact terminal, can be proximate (e.g., and fixedly engaged with) the base housing 102 Further, the negative electrical contact terminal can be disposed in the battery access portion, for example, which may protrude away from the base housing. Additionally, the base housing can comprise the ignition control module, for example, which may comprise circuits, processors, and/or other electrical components, used to control electrical signals sent to one or more ignitors used in the gas appliance. In this implementation, disposing the negative electrical contact terminal, and therefore the battery's negative terminal, away from the ignition control module 72 may mitigate leaked material from the battery potentially contacting the ignition control module.

That is, for example, when the ignition module is operably mounted on the gas appliance, the battery's negative terminal is disposed at a lower elevation than the battery's positive terminal. In this example, resulting leaked material (e.g., likely leaked from the battery's negative terminal) will flow down, away from the positive electrical contact terminal 706, and therefore, away from the ignition control module. In this way, potential damage to the ignition control module resulting from corrosive battery material, for example, may be mitigated.

In one implementation, the battery access portion can comprise a selectably removable cap that is configured to collect material leaked from a battery disposed in the battery compartment. For example, as described above, material may leak from the battery (e.g., typically at the negative terminal end); and, when the negative terminal is disposed at a lower elevation than the positive terminal, the leaked battery material may flow downward toward the negative end. In this example, the negative electrical contact terminal can be disposed in the cap-shaped battery access portion, which may collect any leaked material from the battery. In this way, for example, if one or more portions of the cap-shaped battery access portion are damaged due to exposure to the leaked (e.g., corrosive) battery material, the cap may simply be replaced (e.g., or cleaned), instead of replacing more expensive portions (e.g., or all) of the ignition module.

In one implementation, the battery access portion can comprise an electrical coupler that is configured to electrically couple the negative electrical contact terminal in the battery access portion with the ignition control module when the battery access portion is selectably engaged with the body portion of the battery compartment. That is, for example, the battery access portion may be configured to be selectably removed from the battery compartment, and selectably re-engaged with the battery compartment. In this implementation, for example, the negative electrical contact terminal can be electrically coupled with a first portion (e.g., a wire, such in a spring shape, or other electric al contact) of the electrical coupler, disposed in the battery access portion, and a second portion of the electrical coupler can be disposed in the body portion of the battery compartment. In this implementation, when the battery access portion (e.g., cap) is engaged with the body portion, the first portion of the electrical coupler may electrically couple with the second portion of the electrical coupler. In this way, for example, the negative electrical contact terminal can be in electrical coupling with the ignition control module when the battery access portion is engaged with the body portion of the battery compartment.

In one implementation, the example module can comprise a gasket disposed on the battery compartment. In this implementation, the gasket can be disposed between the battery access portion and the body portion of the battery compartment, and be configured to engage with the battery access portion to mitigate migration of contaminants between the outside and inside of the battery compartment. That is, for example, the gasket may mitigate entry of environmental contaminants (e.g., water, dust, dirt, grease, food or other particles) into the battery compartment. Further, the gasket may mitigate leaked battery materials from flowing out of the battery compartment.

In one aspect, the example ignition module can be mounted on a gas appliance, such as on a vertical surface of the appliance. In one implementation, in this aspect, the base housing can comprise one or more module mounting point components that are respectively configured to be used to mount the base housing on a vertical surface of the appliance. In this implementation, the one or more module mounting point components are configured to mount the base housing such that a first end of the battery compartment, comprising the battery access portion, is disposed at a lower elevation than an opposing, second end of the battery compartment, comprising the body portion. That is, for example, the mounting point components, when mounted, may dispose the battery compartment, and/or the base housing engaged with the battery compartment, at angle that provides a downward slope to the battery compartment. In this way, in this example, any fluids leaked from a battery in the battery compartment can flow down toward the distal end of the battery compartment.

In one implementation, the one or more module mounting point components can comprise a first module mounting foot and a second module mounting foot. In this implementation, the second module mounting foot can comprise a greater thickness than the thickness of the first module mounting foot. In this implementation, the measured thickness for the respective feet, can be measured from a mounting surface of the respective module mounting feet. As an example, when the ignition module is mounted on a gas appliance vertical surface a first end of the module may be disposed below a second end of the module. In this example, the first mounting foot may also be disposed below the second mounting foot. For example, the greater thickness of the second mounting foot, when compared to the thickness of the first mounting foot, can dispose the battery compartment at a downward slope, as described above, when the feet are mounted to the vertical surface.

In one implementation, the respective mounting points can comprise an aperture. That is, the first mounting point can comprise a first aperture, and the second mounting point can comprise a second aperture (e.g., and a third mounting point, if present, can comprise a third aperture, and so on). In this implementation, the respective apertures may be used to receive a fastener (e.g., a screw, bolt, pin, or the like) that can secure the base housing to the gas appliance, such as at the vertical surface. Additionally, the respective mounting points can comprise one or more supports. That is, the first mounting point can comprise a first (set of) support(s), and the second mounting point can comprise a second (set of) support(s) (e.g., and a third mounting point, if present, can comprise a third (set of) support(s), and so on). In this implementation, the respective supports may provide additional support to the respective mounting points, by coupling with the base housing.

In an alternate implementation, an exemplary ignition module can comprise an alternate mounting design. In this implementation, a bottom surface of the module may comprise a plane with a longitudinal axis that is not parallel to the longitudinal axis of the module; such that, when mounted to a vertical surface that is parallel to the longitudinal axis of the module, the battery compartment is disposed at a downward slope toward its distal end. That is, for example, the bottom of the base housing is sloped so that when the base housing is mounted on the vertical surface, the module is angled downward.

Another implementation, an exemplary ignition module, can comprise alternate mounting design. In this implementation, the exemplary ignition module may be mounted on a vertical surface (e.g., having a vertical Y axis) with the ignition module's longitudinal axis lying horizontally (e.g., in the X axis) across the vertical surface (e.g., mounted horizontally on the vertical surface). In this implementation, the first mounting point and the second mounting point can respectively comprise a leading end and a trailing end. The leading end can comprise a thickness that is greater than a thickness "of the trailing end. In this configuration, in this implementation, the exemplary ignition module can be configured to be mounted in a horizontal configuration on the vertical surface. In this way, for example, the housing base, and the engaged battery compartment, can tilt at a downward slope when mounted on the vertical surface.

In an alternate implementation the battery compartment can be disposed in a downward facing direction, such pointing downward vertically. That is, for example, in operation, the battery compartment can protrude downward vertically from the base housing of the ignition module. In one implementation, the base housing may be operably engaged with a vertical surface of a grill, or operably engaged with a horizontal surface of the grill, and the battery compartment can be protruding downward from the base housing.

In this implementation, the battery compartment can comprise a battery access portion, such as a panel, cap, door, lid, or other device used to open the compartment to access the interior to insert, remove, and replace the battery or batteries. As an example, the battery access portion can comprise a cap that is fixedly engaged with the battery compartment during operation. In one implementation, the cap can form a portion of the battery compartment, such as the end or bottom portion. That is, for example, the cap can be configured to hold a portion of the battery, and the remaining portions of the battery compartment can hold the rest of the battery. The battery cap can be coupled with the rest of the battery compartment, such as by threaded engagement, a locking engagement, friction fit, fastener, or some other appropriate coupling.

In one implementation, the cap can comprise the negative terminal of the electrical circuit, and can be configured to operably receive and engage with the negative terminal of the battery. In this way, for example, the positive terminal will be disposed in the top portion of the battery compartment or inside the housing, with the battery compartment protruding downward form the housing. Therefore, if the battery leaks while in the battery compartment leaked battery fluid will flow down toward the cap, for example, and away from the housing portion of the ignition module.

In an alternate embodiment, the ignition module can comprise one or more ignitor terminals or electrodes that are engaged with the housing of the ignition module. For example, the ignitor terminals or electrodes can be operably engaged with a wire that is coupled with an ignitor that provides an ignition source to ignite fuel, such as natural gas, propane, or the like. In one implementation, the ignitor electrode can be disposed in a shroud, cap, or cup-shaped connector that is fixedly engaged with the housing. The electrode connector can be configured to selectably engage with a complementary wired connector, such that a wire electrode terminal electrically couples with the ignitor electrode terminal when the wired connector is engaged with the ignitor connector.

In one implementation, the ignitor connector can comprise a raised portion, such as a ridge, that engages with as shoulder in/on the wire connector (e.g., or vice-versa) when operably coupled together to provide a selectably fixed engagement between the two connectors. Further, in this implementation, when the connectors are operably engaged the ignitor electrode is electrically coupled with the wire electrode to provide an electrical connection between the ignition module and an ignitor.

As an illustrative example, FIG. 1A-1E are component diagrams illustrating various views of an example implementation of an ignition module 100. The ignition module comprises a top 102 and a bottom 104, a first end 106 and a second end 108, and a first side 110 and a second side 112. Further, the ignition module 100 comprises a housing 114 and a battery compartment 116. The housing 114 can house the electrical components that convert stored electrical power from a battery disposed in the battery compartment 116 into electricity with characteristics that are sufficient to provide a spark at a coupled ignitor.

Additionally, the housing 114 can comprise one or more grill couplers 118 disposed on the second side 112. The grill couplers can be configured to couple with complementary ignition module couplers disposed on a target grill. In some implementations, the grill couplers 118 can be disposed on the top 102 of the housing 114. In some implementations, the housing can comprise one or more cover engagement couplers 120, illustrated as slots in this example, which are configured to couple with engagement couplers on a cover that can be selectably placed over the top 102 of the ignition module 100. The housing may also comprise a cover locking engagement member 122 that can be configured to selectably engage with a complementary member on the cover to selectably lock the cover on the top 102 of the ignition module 100.

The battery compartment 116 can comprise the battery access portion 124, illustrated in this example as a cap. In some implementations, the battery cap 124 can be threadedly engaged with the body 126 of the battery compartment, which is fixedly engaged with the housing 114, protruding from the bottom 104. That is, for example, the battery compartment 116 can protrude vertically from the bottom 104 of the housing 114, such that the when the housing 114 is engaged with the target grill, using the grill couplers 118, the battery compartment 116 is disposed downward vertically from the housing 114.

As illustrated, the example ignition module 100 can comprise one or more ignitor couplings 128. In some implantations, the ignitor couplings 128 can be disposed on the top 102 of the ignition module 100, as illustrated, such as when the ignition module 100 engages with the target grill from the second side 112. In alternate implementations, the ignitor couplings 128 can be disposed on one or more of the first side 110, second side 112, first end 106, or second end 108, and the grill couplers 118 can be disposed on the top 102 of the ignition module 100, such that the battery compartment 126 still remains disposed in a downward vertical position.

Further, as illustrated, the housing can comprise ignition activator connectors 130, such as disposed on the top 102 of the ignition module 100. In alternate implementations, the ignition activator connectors 130 can be disposed on other sides of the ignition module 100, such as first side 110, second side 112, first end 106, or second, or even the bottom 104. As an example, the ignition activator connectors 130 can be configured to electrically couple with an ignition activator, such as a switch, button, or some other appropriate electrical activator. For example, the ignition activator can be activated (e.g., pressed), which results in electrical power from the battery being conditioned and fed to the ignitor coupling(s) 128, leading to one or more ignitors that provide an ignition source for fuel from the grill.

Figure 2:
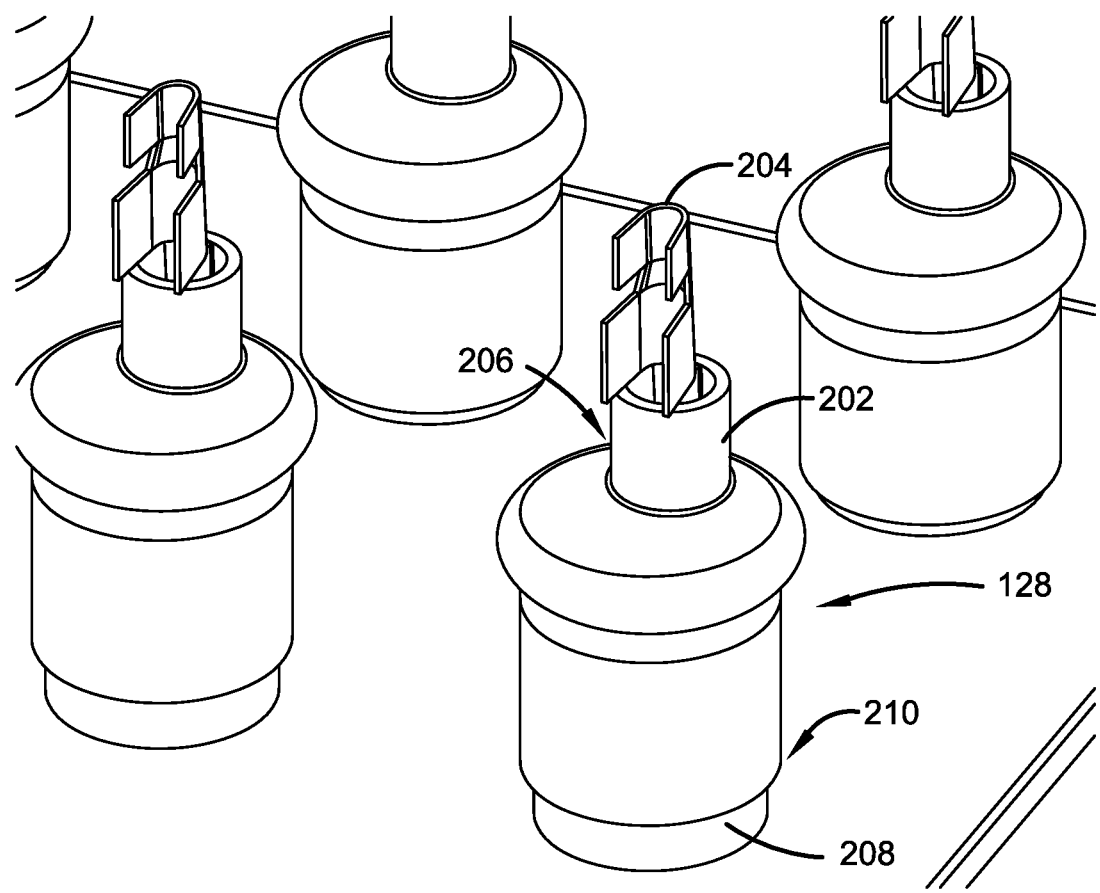
FIG. 2 is a component diagram illustrating a top perspective view of one or more exemplary ignitor couplings in accordance with one or more devices described herein.
Figure 3A:
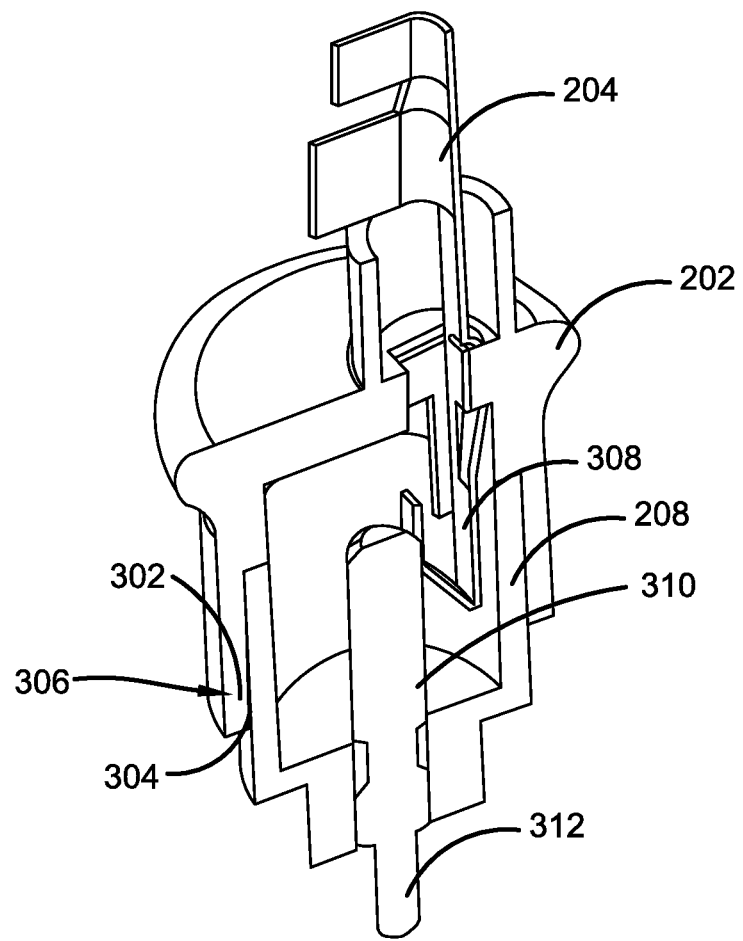
FIGS. 3A, 3B, and 3C are component diagrams illustrating various cut-away views of an exemplary ignitor coupling in accordance with one or more devices described herein.
Figure 3B:
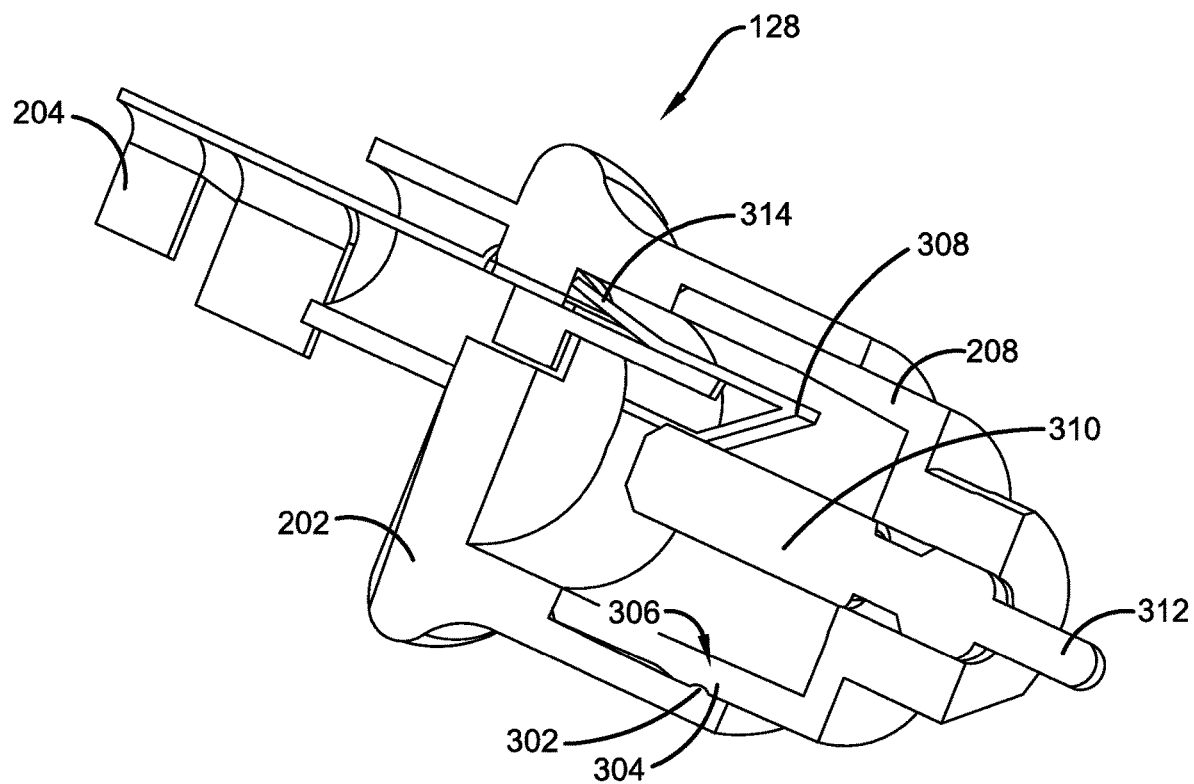
Figure 3C:
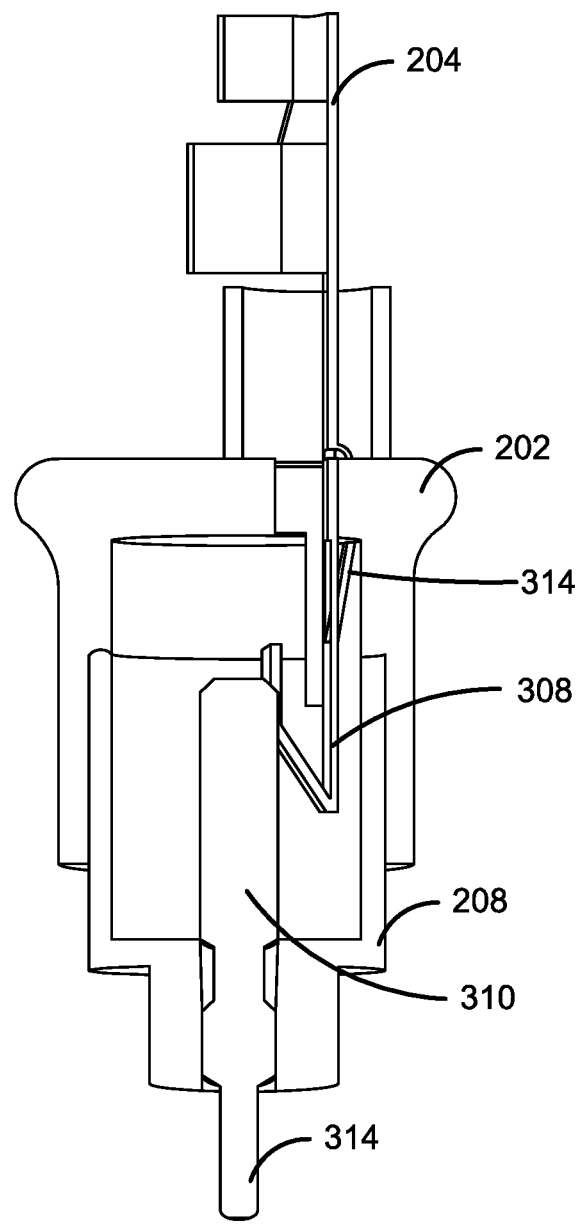
Figure 4A:
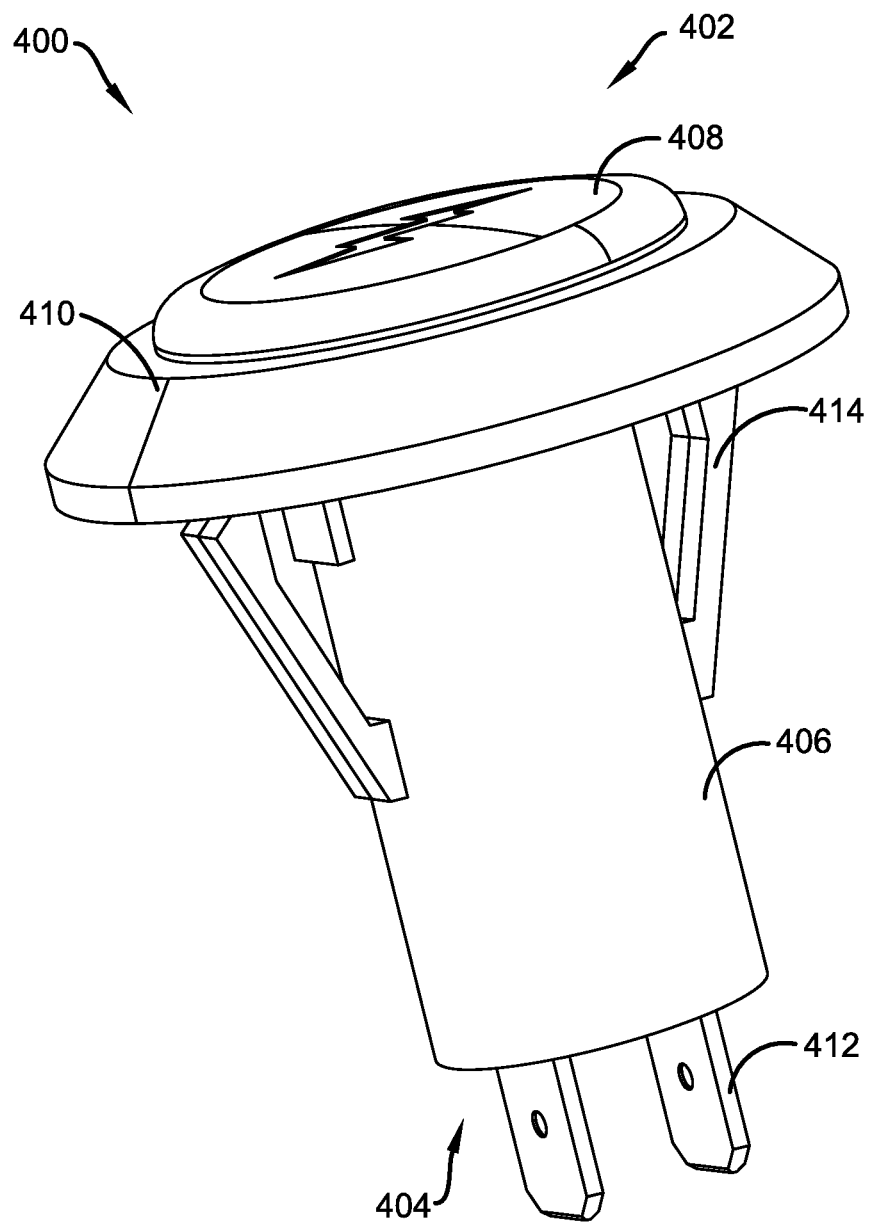
FIGS. 4A and 4B are component diagrams illustrating various views of an implementations of an activator module as described herein.
Figure 4B:
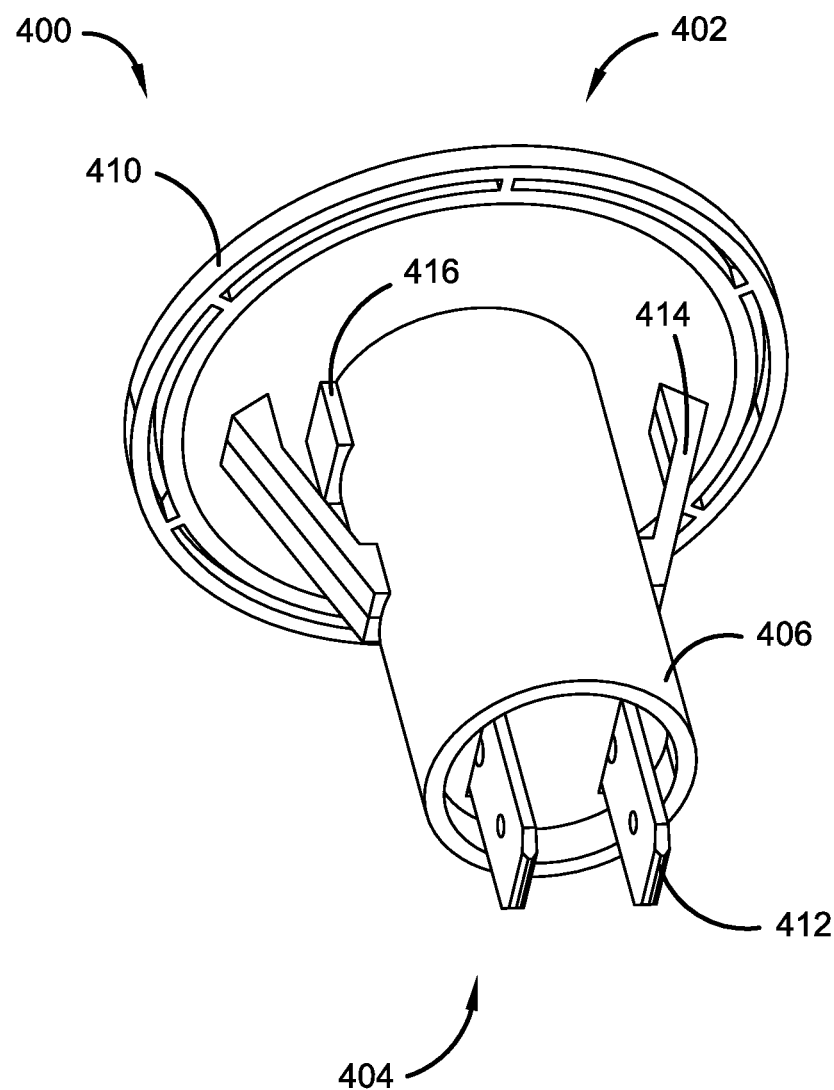

As an illustrative example, FIG. 2 is a component diagram illustrating an example implementation of a plurality of ignitor couplings 128. In this example implementation, the ignitor coupling 128 can comprise a wiring connector 206. The wiring connector can comprise a wiring electrode shroud 202 and a wiring electrode coupler 204. Further, the ignitor coupling 128 can comprise an ignitor connector 210, which comprises an ignitor electrode shroud 208. As an example, the wiring electrode coupler 204 can be fixedly engaged with an ignitor wire (not shown) that leads to an ignitor disposed in a target grill (not shown). In one example, the wire can be fixed to the wiring electrode coupler 204 by crimping the wire in the wiring electrode coupler 204, soldering (or otherwise gluing) the wire to the wiring electrode coupler 204, using a fastener, or some other appropriate connection, or a combination of these. As an example, the wiring electrode shroud 202 can surround the wiring electrode coupler 204, and may provide a guide for appropriate placement of the wiring electrode coupler 204 with respect to the ignitor electrode terminal for proper electrical engagement. Further, in some implementations, the wiring electrode coupler 204 can be covered in a water-resistant covering, such as a plastic wrap, shrink-wrap, or the like, to provide resistance to water intrusion into the ignitor coupling 128.

Further, the ignitor connector 210 may comprise an ignitor electrode terminal surrounded by the ignitor electrode shroud 208. As an example, the ignitor electrode shroud 208 can be configured to selectably engage with the wiring electrode shroud 202, such as by a friction fit, and/or using a combination of ridges/shoulders to provide a fixed coupling during operation. In one implementation, in operation, the ignitor connector(s) 210 can protrude upward from the top surface 102 of the housing 114, and can receive the wiring connectors 206.

With continued reference to FIGS. 1A-1E, and FIG. 2, FIGS. 3A-3C are component diagrams illustrating an example implementation of an ignitor coupling 128 as a cutaway view, in section. As illustrated, the ignitor coupling 128 can comprise the wiring connector shroud 202 that is operably engaged with the ignitor electrode shroud 208. In this implementation, an inner surface of the wiring connector shroud 202 can slidably engage with an outer surface of the ignitor electrode shroud 208, as they can be configured to fit together in operation. Further, the inner surface of the wiring connector shroud 202 can comprise a ridge or shoulder 302 that is configured to selectably engage with a ridge or shoulder 304 on the outer surface of the ignitor electrode shroud 208. In combination, the wiring shroud ridge/shoulder 302 and the ignitor shroud ridge/shoulder 304 can operably form an ignitor coupling locking engagement 306.

Additionally, the example ignitor coupling 128 can comprise the wire electrode 308 that is electrically coupled with the wiring electrode coupler 204 (e.g., coupled with an ignitor wire). In one implementation, the wire electrode 308 can be configured (e.g., shaped and sized) to selectably engage with an ignitor electrode 310 that is electrically coupled with the ignition module 100, such as through an ignitor electrode coupler 312, the electrically couples with components in the ignition module 100. In one example, the ignitor electrode 310 can comprise an electrically conductive post-shape that is configured to engage the wire electrode 308 in electrical coupling. In this example, the post can comprise a dome or cone shape to help guide the wiring electrode 308 into the electrical coupling. In this example, the wiring electrode 308 can comprise a form (e.g., spring-like, u-shaped, v-shaped, or the like) that is biased toward the post, such that the wiring electrode 308 is forced against the post when appropriately engaged with the ignitor electrode 310. As illustrated, for example, the engagement of the wiring connector 206 with the ignitor connector 210 provide an electrical coupling that is resistant to water intrusion.

In one implementation the wiring connector 206 can comprise a biasing component 314 that is used to bias the wiring electrode 308 away from the wall of the wiring shroud 202, and toward the ignitor electrode 310. The biasing component 314 can be configured as a spring, leaf, or any other appropriate shape, to reinforce the biasing action of the wiring electrode 308 toward the ignitor electrode 310. In this way, for example, the electrical coupling between the wiring electrode 308 and the ignitor electrode 310 can be appropriately maintained during operation, and can provide for a longer life, less maintenance, and desired performance of the ignitor coupling 128.

In one aspect, a target grill may comprise an ignitor activator that is used to activate the ignition module to provide conditioned electricity to an ignitor disposed in the grill. As one example, the ignitor activator can comprise a button or electrical switch that closes a circuit to provide electricity to the ignitor, which provides a spark to ignite fuel in the grill. As an illustrative example, FIGS. 4A, 4B, 5A, and 5B are component diagrams that illustrate one example implementation of an ignitor activation module 400, that can be used to initiate the ignition module (e.g., 100 of FIG. 1A) to activate an ignitor in the target grill.

In this example implementation, the ignitor activation module 400 can take the form of a type of button-shaped device that comprise a top 402 (e.g., or front, depending on disposition in the grill) a bottom 404 (e.g., or back), and a body 406. In this implementation, the top portion 402 can comprise a button-like user interface 408 that may be pressed inward (e.g., downward or backward) by a user to activate the ignitor activation module 400, and a top shroud 410 that surrounds the button-like user interface 408, for example, to provide for weather-resistance.

Further, the bottom portion 404 can comprise the body 406, module connectors 412, and appliance engagement coupler 414. The module connectors 412 can comprise electrically conductive materials that are configured to provide an electrical coupling (e.g., close a circuit) when the ignitor activation module 400 is activated, such as using the button-like user interface 408. The module connectors 412 can be selectably engaged with an ignitor module (e.g., 100), for example, using ignition activator connections (e.g., 130 of FIG. 1B). As an example, pressing the button 408 on the ignitor activation module 400 can close a circuit between the module connectors 412, which closed a circuit in the ignitor module (e.g., 100) when the ignitor activation module 400 is engaged with the ignition activator connections (e.g., 130), thereby generating an electrical pulse to an ignitor in the target grill.

Additionally, the ignitor activation module 400 can be engaged with a target grill using the grill engagement couplers 414. That is, for example, the grill engagement couplers 414 may fit into slots disposed in a face of the grill, which forces the grill engagement couplers 414 inward. In this example, the grill engagement couplers 414 are biased outward, such that when the grill engagement couplers 414 clear the face of the grill, the grill engagement couplers 414 push back outward to provide a fixed engagement with the face of the grill. In some implementations, the ignitor activation module 400 can comprise an orientation component 416, such as a stop, shoulder, ridge, or the like, that aligns with a complementary feature in the face of the grill, such that the ignitor activation module 400 may merely properly engage with the grill when the orientation component 416 is properly aligned with the complementary feature in the face of the grill. In this way, for example, the ignitor activation module 400 may be placed in a desired orientation in a grill for appropriate use by a user.

Figure 5A:
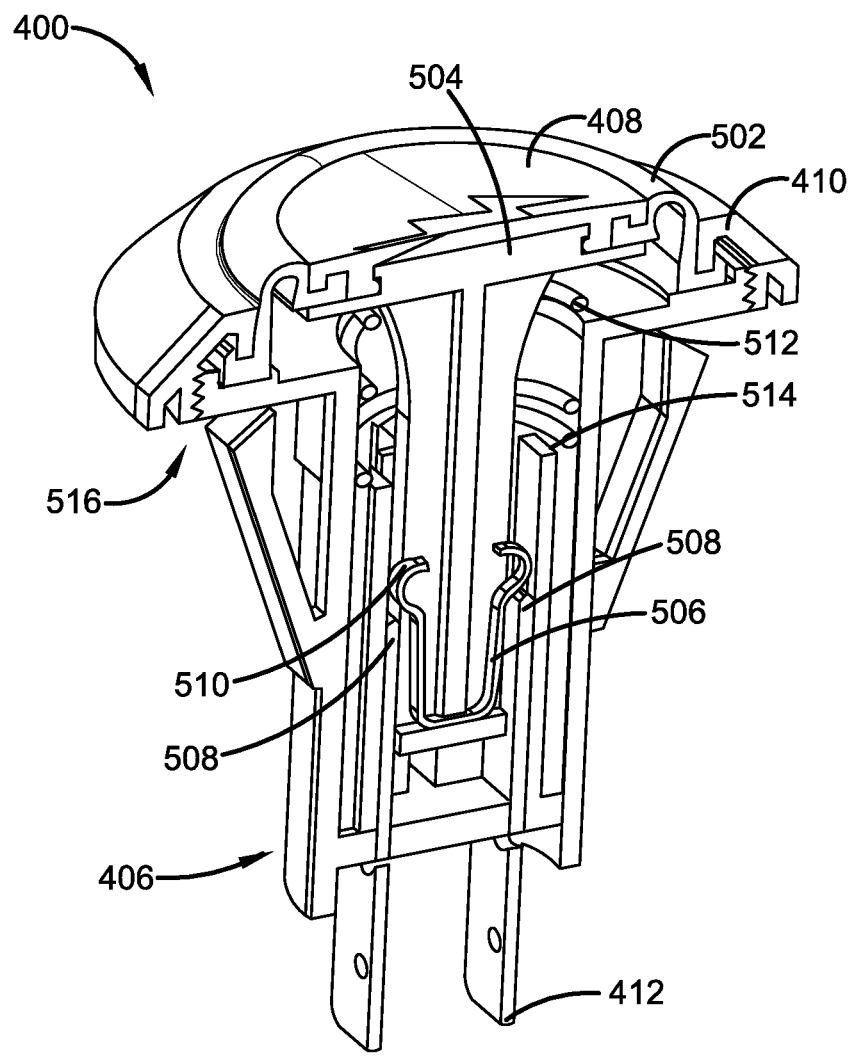
FIGS. 5A and 5B are component diagrams illustrating various cut-away views of an implementations of an activator module as described herein.
Figure 5B:
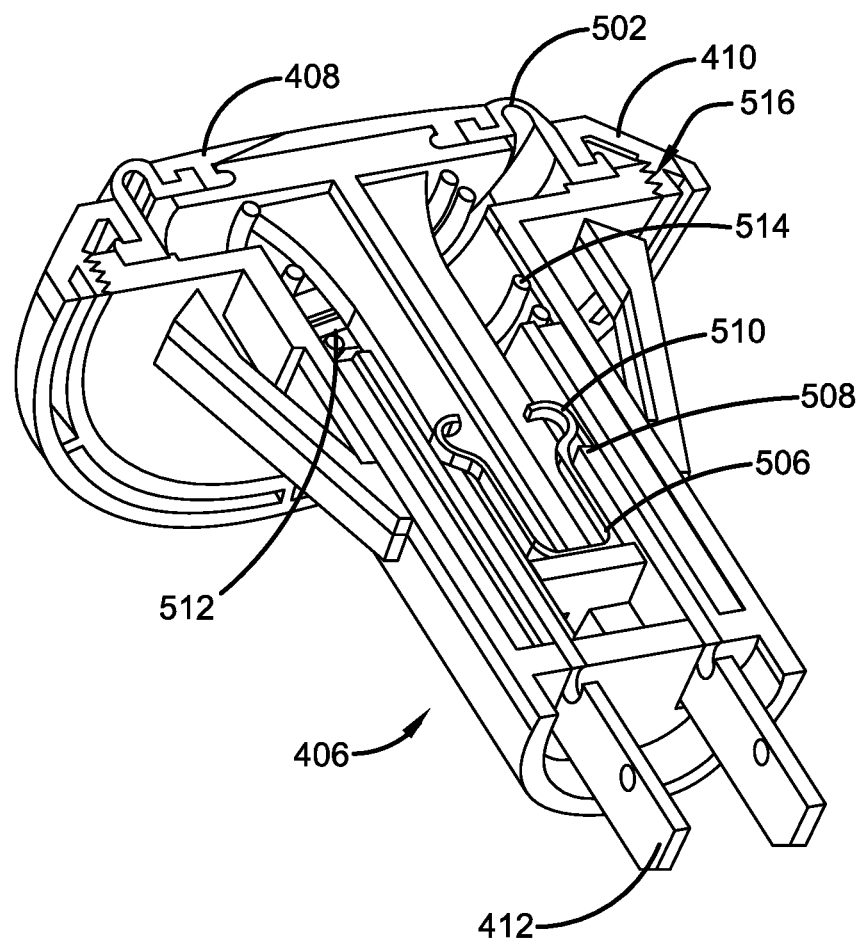

FIGS. 5A and 5B illustrate cut-away view, in perspective, of the example, ignitor activation module 400. With continued reference to FIGS. 4A and 4B, the ignitor activation module 400 can comprise a flexible member 502, having a body that is disposed between, and operably, fixedly engaged with, the button 408, acting a cover, and the shroud 410. As illustrated, the body of the flexible member 502 can be configured to provide resistance to weather (e.g., wind, rain, snow, etc.) for the top portion 402 of the ignitor activation module 400, while allowing the button 408 to move appropriately between a static position (e.g., not activated, as illustrated) to an activated or depressed position (not shown). The flexible member can comprise a polymer, polymer blend, or some other appropriate material that is both flexible and weather resistant, for example, an may provide for a plurality of movements back and forth without damage.

As illustrated in FIGS. 5A and 5B, the button or activator 408 can be disposed on top of (e.g., or integrated with) the top surface of a plunger 504. The plunger 504 can be configured to act as a mechanical activation mechanism to facilitate opening and closing of the circuit, for example, to activate the ignitor activation module 400, as described herein. The bottom portion of the plunger 504 can be fixedly engaged with an activation electrode 506 that electrically couples (e.g., closes the circuit between) the respective module connectors 412. As illustrated, in this implementation, the tops 508 of the module connectors 412 are disposed inside the body 406 of the ignitor activation module 400, and are not electrically coupled in the static position (e.g., button not depressed). However, the activation electrode 506 comprises standouts, ears, or bends, which can contact the respective tops 508 of the module connectors 506 to close the circuit between them, and electrically couple them together, when the plunger 504 is depressed. In this way, pressing the button activator 408 can close the circuit between the module connectors 412.

Further, as illustrated, in this implementation, the ignitor activation module 400 can comprise a spring 512 disposed in the body 406. The bottom or backside of the spring 512 can be engaged with a spring shoulder 514 fixed inside the body 406; and the top of the spring 512 can be engaged with the underside of the plunger 504 top. The spring can be configured to bias the plunger 504 outward/up, such that the activation electrode 506 is disposed in an open circuit position, as illustrated in FIGS. 5A and 5B. Additionally, the shroud 410 can be configured to threadedly engage with body 406 in a threaded engagement 516. In this way, for example, the flexible member may be fixedly engaged with the body 406 and the shroud 410 to improve the weather resistance.

As an illustrative example, with reference to FIGS. 1-5, the ignition module 100 may be engaged with a target grill (not shown), such as using the one or more grill couplers 118. Further, ignitor wires can be coupled to the ignition module 100 using the one or more ignitor couplers 128. Additionally, the ignitor activation module 400 can be coupled to the ignition module using the ignition activation connections 130, and coupled to the grill using the grill engagement couplers 414. In this example, a user may desire to ignite fuel at a burner in the grill using one or more ignitors disposed proximate the respective burners. As such, the user can push the button-like user interface 408, which closes the circuit in the ignitor activation module 400, closing the circuit between the battery in the battery compartment 116 and the ignitor electrode 310, thereby providing appropriate electrical power to one or more of the ignitors, which generate an ignition source (e.g., spark or plasma) proximate the burner dispensing fuel, igniting the fuel.

In another aspect, an improvement to the connection of wires with the ignition module may be devised, for example, to ease assembly of electrical connections to a spark generator in a gas appliance. In this aspect, for example, the electrical connections can terminate in a polymer-based block that comprises a connection point. The respective connection blocks may be linked together into a larger combined block. The combined block can be coupled with a complementary receiving block that is disposed on the spark generator. The receiving block can comprise spark generator connection points that electrically couple with the corresponding electrical connection point when the combined array is coupled to the receiving block array.

In this aspect, the spark generator can have one or more connectors, for example, for connecting to an activator, such as a button or switch to activate the generator, or connecting to an ignitor wire or electrode that creates the spark. In one implementation, the connection can be achieved using modular connector components. In this implementation, the modular connector can comprise a plastic (e.g., some type of polymer-based material) block that is fixedly engaged with a metal connection point. For example, a first connection point may be disposed on the spark generator, fixedly engaged with a first plastic block; and a second connection point may be disposed on the end of a wire, fixedly engaged with a second plastic block. In this example, the first plastic block can be selectively, releasably engaged with the second plastic block. Further, in this example, connecting the first plastic block with the second plastic block electrically couples the first connection point with the second connection point. In this way, for example, connecting the first plastic block with the second plastic block creates an electrical coupling between the wire and the spark generator.

In one implementation of a system for improving ease of assembly of electrical couplings in a gas appliance can comprise a first engaging block that comprises a polymer-based material formed into a block. The first engaging block can comprise a first electrical component connection point at a terminus of a first electrical coupling. Further, a second engaging block can comprise a polymer-based material formed into a block. The second engaging block can comprise a second electrical component connection point at a terminus of a second electrical coupling. The second engaging block can couple with the first engagement block in a selectively fixed arrangement resulting in a combined block. Additionally, a receiving block array can be disposed on a spark generator of a gas appliance. The receiving block array can comprise a polymer-based material formed into a block that receives and selectively, fixedly couples with the combined block. The receiving block array can comprise a first spark generator connection point and a second spark generator connection point respectively electrically coupled with the spark generator. The first electrical coupling and the second electrical coupling can respectively electrically couple with the first spark generator connection point and a second spark generator connection point when the receiving block is fixedly coupled with the combined block.

In this aspect, in one implementation, the plastic connection blocks can be used to make assembling electrodes (e.g., high voltage (HV) connections) and other connections on a grill or appliance easier, using less force, and resulting in an improved coupling. For example, in this implementation, the insertion force can be reduced by coupling two or more of the modular connector blocks together to form a larger, single connector containing the respective connections for a particular system coupled with the generator. In this example, this larger, assembled connector, can be easily coupled with (e.g., snapped on to) the spark generator in one motion, instead of several connections.

Additionally, in one implementation, the plastic blocks can be configured to hold the connection together. That is, for example, the first plastic block may be configured to couple with the second plastic block such that they (e.g., selectively, releasably) lock together. In this way, the force used to couple the connections can be reduced, and the number of connection motions of the iterative process of coupling the connections can be reduced. In this aspect, the benefit of the modular connection includes a reduction in the insertion force used to couple the connections, which can increase productivity. Further, the reduced insertion force of connector can improve safety of an assembly line worker who, typically, has to connect sometimes thousands of these connectors every shift.

In one implementation, the connectors can be color-coded, for example, such connectors that couple together (e.g., the first block and the second block) comprise corresponding colors (e.g., the same color). In this way, for example, an installer (e.g., factory worker, end user, repair person) can easily recognize the appropriate connections. That is, for example, an array of connection points can be disposed on a spark generator respectively corresponding to an electrical connection (e.g., one or more activators, such as for individual burner, one or more electrodes to generate a spark, one or more power supply inputs). In this example, respective connection points can be engaged with (e.g., disposed in) a plastic block that is color coded with a different color (e.g., for each type of different connection used). Further, respective electrical couplings (e.g., wires) can have a connection point engaged with (e.g., disposed in) a plastic block that comprises a color corresponding to one of the color coded blocks on the spark generator. In this example, a user may simply connect (e.g., slide, snap, rotate, fit, or otherwise engage) the blocks for respective couplings together into a larger, combined block of connected individual unit blocks in an arrangement corresponding to the color-coded arrangement on the spark generator. The user can engage (e.g., slide, snap, rotate, fit, or otherwise engage) the combined block with the array of color coded blocks on the spark generator with one motion. In this way, the user can, more easily electrically connect the various parts of a system with the spark generator in a manner that is more efficient, with less effort, and in a correct alignment.

In one implementation, a poka-yoke concept can be incorporated into the design of the blocks. For example, the poka-yoke design means that the connectors cannot be assembled incorrectly. That is, for example, respective blocks in an array of blocks that are coupled together, are configured in a way that allows them to only fit in one arrangement. In this way, the respective electrical connections can only be made in one arrangement, which mitigates the chances of improper installation. As one example, the first block may be configured to only fit in electrical engagement with the second block in one way, such that the shape and/or size of the respective blocks allows for the coupling to take place in only one manner. Further, a third block (e.g., on a park generator connection point) may be configured to merely fit in electrical engagement with a fourth block (e.g., on a wire connection point) in one way. In one implementation, the second block and the fourth block may be configured to couple together in merely one arrangement to form the larger combined block array, to couple with the first and third blocks. In this way, for example, the appropriate electrodes can be attached to the appropriate terminals on the spark generator.

In one implementation, the color-coded arrangement of the connectors can be combined with the poka-yoke design of the connectors. In this way, the ease of assembly of the larger combined blocks can be improved with a visual confirmation of the appropriate arrangement. Further, assembly is improved for all of the users, such as the factory worker who is assembling the product that is sent to consumers, the end user who may be repairing or assembling the grill, and the repair person who performs maintenance and repair.

As illustrated in FIGS. 1A-1E, and 2, an ignition module 100, such as a spark generator, can comprise with existing electrical coupling points (e.g., 128). In this example, the spark generator has a plurality of separate, individual electrode connection points disposed on the outer case, respectively comprising a metal connection point, configured as a male connector (e.g., a metal wire sticking out of the colored shrouds). Further, respective coupling wires have a small, female connection point disposed at the end. The female connection point is merely a hollow metal tube that slides onto the male connection point with a friction fit. The force needed to slide the female connection point onto the male connection point is significant, as the friction fit need to be sufficient to hold them in electrical coupling during assembly and use. For example, the force needed to couple the connection points, along with the overall design, often leads to damage to the electrical coupling, such by bending and/or cracking the wire, connection point, or the engagement between the connection point and the wire or spark generator.

Figure 6:
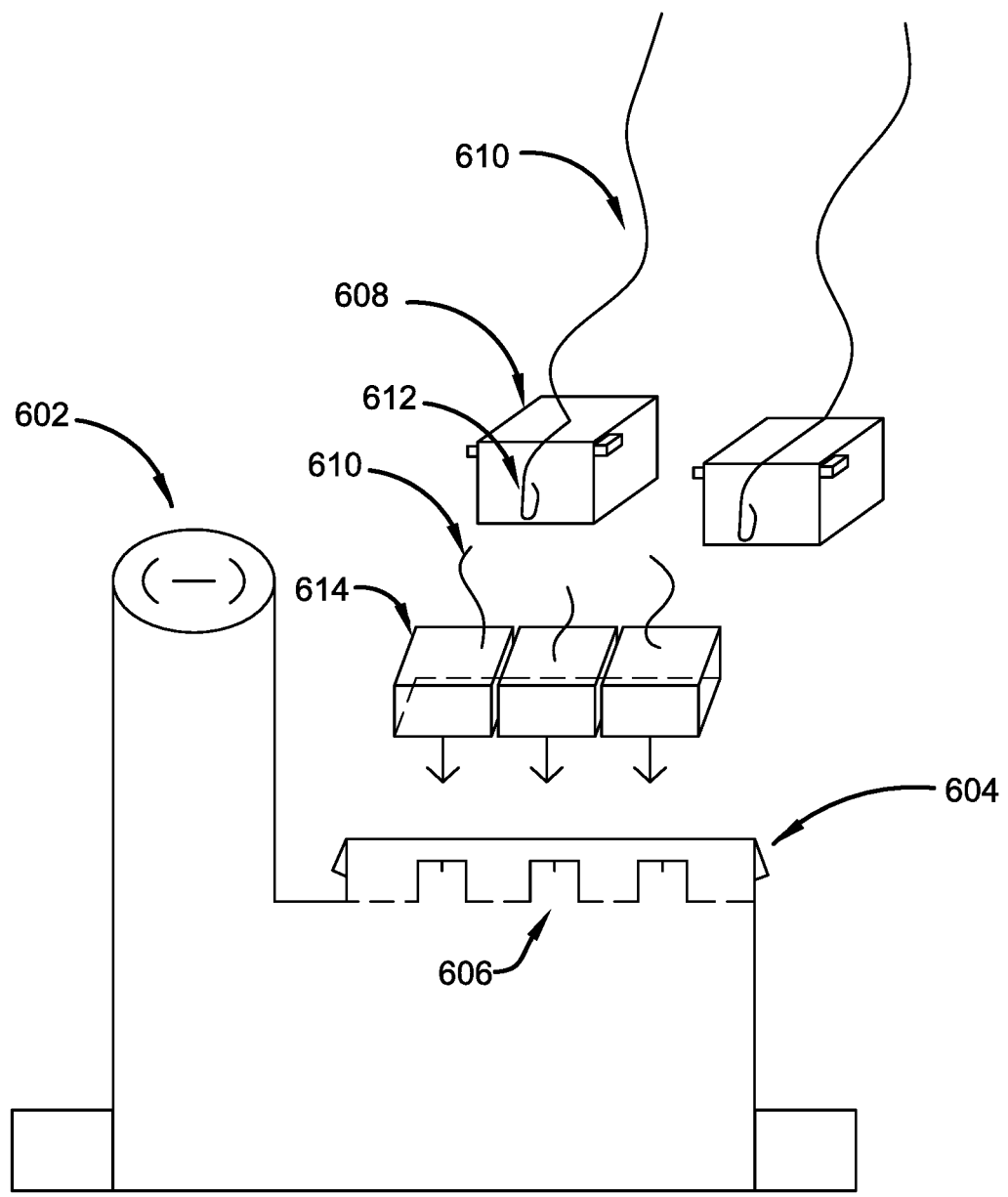
FIG. 6 is a component diagram illustrating an alternate implementation of a spark system for improving ease of assembly of connections on a spark generator.

FIG. 6 is a component diagram illustrating one implementation of a system 600 for improving the ease of installation of connections between the spark generator 602 and the various components of a gas-fired appliance. In this example, system 600, the spark generator 602 can comprise a receiving block array 604. The receiving block array 604 may comprise a single unit configured to couple (e.g., receive) with one or more engaging blocks 608; or the block array 604 may comprise a combination of two or more units configured to respectively couple with one or more engaging blocks 608. In this implementation, the receiving block array 604 can comprise one or more spark generator connection points 606, disposed in the block array 604. The spark generator connection points 606 can be disposed in electrical coupling with corresponding components in the spark generator 602.

In FIG. 6, the example system 600 can comprise the one or more engaging blocks 608. The respective engaging blocks 608 can be engaged with an electrical coupling (e.g., wire) that terminates at a coupling connection point 612 disposed in the corresponding engaging block 608. In this example, two or more engaging blocks 608 can be coupled together in a selectively fixed arrangement, and the resulting larger combined engaging block array 614 can be coupled with the receiving block array 604, such as with one motion. In one implementation, the receiving block array 604 and the combined block array 614 can be configured to couple together in a selectively fixed arrangement, such that they may not uncouple during typical use. That is, for example, a locking mechanism may be disposed on (e.g., formed with) the respective block arrays; and the locking mechanism may couple together in a complementary arrangement when engaged appropriately.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. An ignition module for use on a gas appliance, comprising:
 a base housing comprising a top surface, a bottom surface, and one or more side walls, the base housing configured to operably mount on a gas appliance surface, by selectably engaging one of the one or more side walls with the appliance surface;
 an battery compartment engaged with the base housing, and comprising a longitudinal axis of the disposed substantially perpendicular to the bottom surface, a positive terminal disposed along the longitudinal axis, and a negative terminal dispose at the opposite end of the battery compartment along the longitudinal axis, the negative terminal operably disposed lower than the positive terminal, the battery compartment comprising a battery access cap, operable to selectably access the battery compartment; and one or more ignition terminals disposed on the top surface, wherein the one or more ignition terminals comprise an ignition electrode comprising a post projecting from the top surface, wherein the one or more ignition terminals comprise a wire electrode that is operably electrically coupled with a spark generator in the gas appliance, and wherein the wire electrode comprises a hook shape providing a biasing force that provides for the wire electrode to be selectably connectable with the ignition electrode to operably hold the wire electrode against the side of the ignition electrode.

2. The module of claim 1, the battery access cap configured to collect material leaked from a battery operably disposed in the battery compartment.

3. The module of claim 1, comprising a gasket disposed on the battery compartment, and configured to engage with the battery access cap to mitigate migration of contaminants between the outside and inside of the battery compartment.

4. The module of claim 1, the negative terminal disposed in the battery access cap.

5. The module of claim 1, at least a portion of the battery compartment disposed inside the base housing.

6. The module of claim 1, comprising an ignition activation terminal disposed on the top surface.

7. The module of claim 1, the one or more ignition terminals comprising a two piece shroud, a first piece of the shroud housing the ignition electrode, and a second piece of the shroud housing the wire electrode, wherein the wire electrode is disposed through a top surface of the second piece offset from the center, such that when the second piece is selectably engaged with the first piece, the wire electrode slidably engages with the side of the post of the ignition electrode.

8. The module of claim 7, the second piece of the shroud comprising a biasing spring that biases the wire electrode away from a wall of the second piece, and operably toward the post of the ignition electrode.

9. An ignition module for use on a gas appliance, comprising:
a housing comprising a top wall, bottom wall, and a side wall, the side wall configured to be operably mounted on a vertical surface of the gas appliance;
a battery compartment at least a portion of which projects downward from the bottom wall and configured to be disposed in a downward, substantially vertical position when operably mounted to the gas appliance, the battery compartment comprising a negative terminal disposed at a bottom of the battery compartment and a positive terminal disposed at a top of the battery compartment in the housing, the bottom of the battery compartment comprising a battery access portion; and
one or more ignition terminals disposed on the top wall, respectively comprising an ignition electrode, the one or more ignition terminals comprising a wire electrode to operably electrically couple with a spark generator in the gas appliance, the wire electrode selectably connectable with the ignition electrode using a biasing force to operably hold the wire electrode against the side of the ignition electrode.

10. The module of claim 9, the battery access portion comprising a selectably attachable access cap in which is disposed the negative electrical terminal of the module.

11. The module of claim 9, the battery access portion comprising an electrical coupler to electrically couple with the negative terminal in the battery access portion with the module when the battery access portion is selectably engaged with the battery compartment.

12. The module of claim 9, the one or more ignition terminals comprising a two piece shroud, a first piece of the shroud housing the ignition electrode, and a second piece of the shroud housing the wire electrode, wherein the wire electrode is disposed through a top surface of the second piece offset from the center, such that when the second piece is selectably engaged with the first piece, the wire electrode slidably engages with the side of the post of the ignition electrode.

13. The module of claim 9, at least a portion of the biasing force provide by a hook shape at the end of the wire electrode providing a biasing force toward the ignition electrode.

14. A gas appliance ignition module, comprising:
a housing comprising a top surface, a bottom surface, and four side walls, one of the side walls configured to selectably engage with a vertical surface of the gas appliance, thereby disposing the top surface over the bottom surface;
a battery compartment projecting substantially vertically downward from the bottom surface, the battery compartment comprising a negative terminal disposed in a selectably removable cap at a bottom of the battery compartment, and the positive terminal disposed in the top of the battery compartment in the housing, the selectably removable cap configured to provide selectable access to an inside of the battery compartment and to collect leaking fluid from a battery disposed in the battery compartment; and
one or more ignition terminals disposed on the top surface, respectively comprising an ignition electrode, the ignition electrode comprising a post housed in a first portion of shroud to receive a second portion of the shroud to couple the ignition electrode with a wire electrode housed in the second portion of the shroud, wherein the wire electrode is disposed through a top surface of the second portion offset from the center, such that when the second portion is selectably engaged with the first portion, the wire electrode slidably engages with the side of the post of the ignition electrode.

15. The module of claim 9, comprising a water-resistant material that covers the wire electrode.

16. The module of claim 14, wherein the post is dome shaped.

17. The module of claim 14, wherein the wiring electrode has a hook shape.

18. The module of claim 14, comprising a gasket disposed on the battery compartment, wherein the gasket is configured to engage with the selectably removable cap to mitigate migration of contaminants between the inside and outside of the battery compartment.

19. The module of claim 14, comprising an ignition activator connector disposed on the top surface of the housing and configured to couple to with an ignition activator.

20. The module of claim 14, wherein the wire electrode is operably electrically coupled with a spark generator in the gas appliance.

* * * * *